June 16, 1942. G. A. LYON Re. 22,119

ORNAMENTAL MEMBER FASTENING MEANS

Original Filed July 29, 1937 3 Sheets-Sheet 1

Inventor

GEORGE ALBERT LYON.

by Charles Allen Attys.

June 16, 1942. G. A. LYON Re. 22,119

ORNAMENTAL MEMBER FASTENING MEANS

Original Filed July 29, 1937 3 Sheets-Sheet 2

INVENTOR
GEORGE ALBERT LYON.
BY Charles Hill ATTY.

June 16, 1942. G. A. LYON Re. 22,119

ORNAMENTAL MEMBER FASTENING MEANS

Original Filed July 29, 1937 3 Sheets-Sheet 3

Inventor
George Albert Lyon.
by Charles Allen Attys.

Reissued June 16, 1942

Re. 22,119

UNITED STATES PATENT OFFICE 22,119

ORNAMENTAL MEMBER FASTENING MEANS

George Albert Lyon, Allenhurst, N. J.

Original No. 2,193,106, dated March 12, 1940, Serial No. 156,280, July 29, 1937. Application for reissue December 23, 1940, Serial No. 371,441

15 Claims. (Cl. 301—37)

This invention relates to an ornamental member fastening means, and more particularly to a means for detachably securing an ornamental member to a vehicle wheel which permits the ornamental member to be mounted with very little effort but which requires a relatively great force to disengage the ornamental member from the wheel.

In designing ornamental members adapted to be secured on the outer side of a wheel and to the means for securing the same thereon, it is considered important to provide a construction which may quickly and easily be assembled, which will not accidentally come off due to vibration or sudden jar, and which may readily be disassembled when desired. The most desirable construction, therefore, would include a mounting means which requires very little force to assemble the ornamental member on the wheel, but which requires a relatively great force to remove the ornamental member from the wheel. Furthermore, a mounting means of the above type preferably should be hidden from view in the assembled position of the ornamental member on the wheel. Due to the fact that in practice an ornamental member is frequently removed from the wheel in order to afford access to the wheel mounting bolts, it is also desirable to provide some form of attaching means for detachably securing the ornamental member to the wheel which may readily be replaced when broken or otherwise unfit for use.

It is an object of this invention to provide a novel attaching means for detachably securing an ornamental member for a wheel which possesses the above highly desirable characteristics.

Another object of this invention is to provide a novel wheel assembly including novel means for mounting an ornamental member on a wheel, which is economical to manufacture, and which is rugged and reliable in use.

A further object of this invention is to provide a novel method and means of mounting an ornamental member on a wheel which requires only a relatively small force to mount the member, but which requires a relatively great force to dismount the member from the wheel.

A still further object of this invention is to provide a novel means for detachably securing an ornamental member on a vehicle wheel, the securing or attaching means being fastened to the wheel by a wedging or biting action of the tail portion of the means.

Another and further object of this invention is to provide a novel form of easy-on hard-off attaching means for detachably securing an ornamental member to a vehicle wheel, the attaching means being secured to the wheel in a novel manner.

Another and still further object of this invention is to provide means for mounting an ornamental member on a wheel including a plurality of leaf spring ornamental member retaining elements of novel design, which elements operate in a novel manner to detachably secure an ornamental member to a wheel.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1:
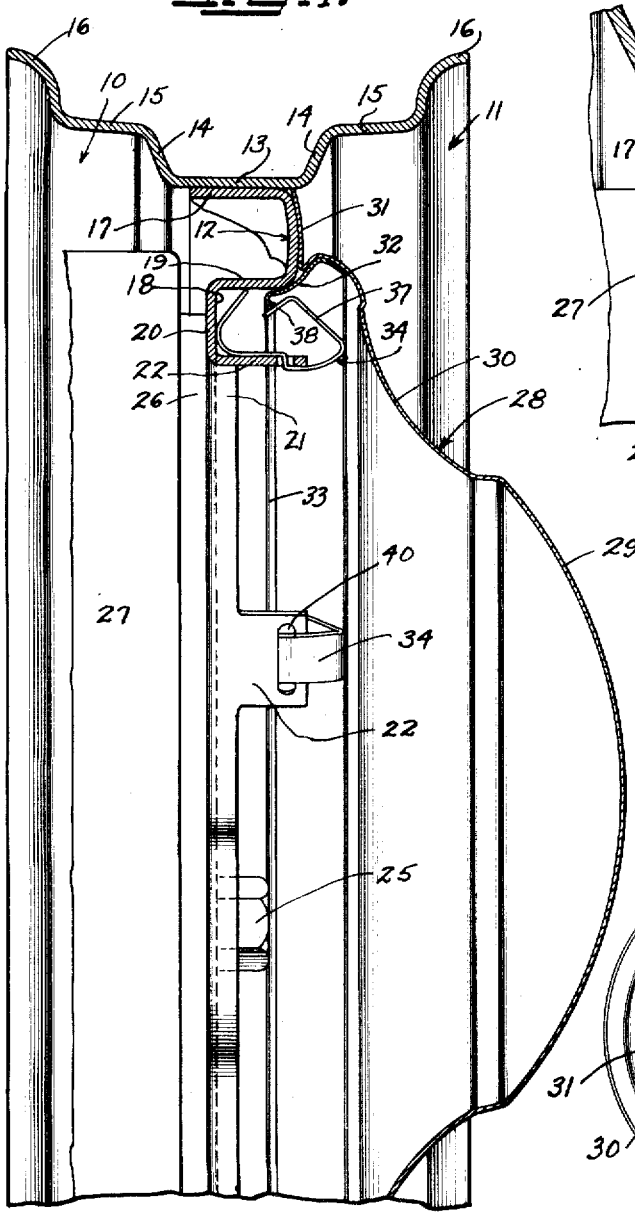
Figure 1 is an elevational view, partly in cross section, of the upper half of a wheel assembly including an ornamental member and novel means for mounting the ornamental member on the wheel.
Figure 2:
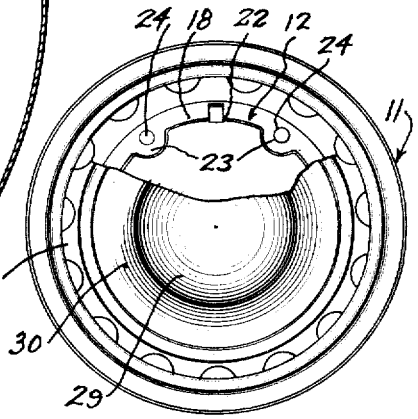
Figure 2 is a front elevational view of a wheel assembly, a portion of the ornamental member being broken away to show the means for mounting the ornamental member on the wheel.

Referring now to Figures 1 and 2 of the drawings, the wheel assembly illustrated includes a wheel 10 having a rim part 11 and a body part 12. The rim 11 is illustrated as being of the usual drop center type having a base flange 13, opposite side flanges 14, opposite intermediate flanges 15, and opposite edge portions 16. The body part 12 of the wheel 10, as may readily be seen in Figure 1, has an irregular cross sectional surface configuration. The upper part of body part 12 is provided with a laterally extending flange 17 which is adapted to fit below the base flange 13 of rim 11 and be secured thereto in any suitable manner such as by welding, riveting, or the like. The body part 12 intermediate its inner and outer extremities is provided an annular recess 18 which is formed by a rearwardly extending outer wall portion 19, a base portion 20, and an outwardly extending inner wall portion 21. The wall portion 21 is provided at a plurality of circumferentially spaced points with outwardly extended tab portions 22. At a plurality of circumferentially spaced points intermediate tab portions 22 are enlarged radially inwardly extending portions 23 which are apertured as at 24 for the reception of the usual wheel fastening bolt 25. Radially inwardly extending portions 23 preferably form a continuation of the base wall 20 of the annular recess 18. In this manner a portion of the base wall 20 of recess 18 and the inner surface of portions 23 are adapted to abut the wheel fastening plate 26 of the brake drum 27. It is to be understood that the wheel fastening bolts 25 extend through apertures 24 into threaded engagement with suitable apertures (not shown) in the wheel fastening plate 26 thereby to secure the wheel 10 to the vehicle in the usual manner.

An ornamental member 28 is mounted over the outer face of the wheel 10. The ornamental member 28 may, of course, be of any desired configuration which is pleasing to the eye and which will enhance the general appearance of the vehicle. As shown in Figure 1 of the drawings, ornamental member 28 includes a central dome shaped portion 29 which in general simulates the usual vehicle hub cap, an intermediate portion 30, and an outer apron 31. Secured to the underside of ornamental member 28 approximately at the junction point of intermediate portion 30 and outer apron 31 is an obliquely inwardly extending ornamental member fastening skirt 32 having an underturned inner edge 33. Obliquely inwardly extending fastening skirt 32 may be secured to the ornamental member 28 in any suitable manner such, for example, as by welding. As will readily be observed upon a cursory examination of Figures 1 and 2 of the drawings, the ornamental member 28 extends substantially across the outer face of the wheel 10 within the rim 11. The place at which the outer edge of the ornamental member 28 terminates, however, is not of the essence of the present invention, and as will readily be understood by those skilled in the art, the form of the ornamental member may be varied through wide limits without departing from the spirit and scope of the present invention.

The novel ornamental member retaining means, which forms one of the cardinal features of the present invention, will now be described.

Figure 4:
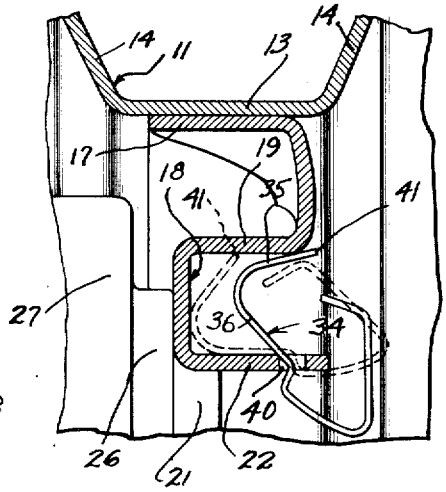
Figure 4 is an enlarged fragmentary elevational view, partly in cross section, showing the manner in which the spring clip element is secured to the wheel.
Figure 3:
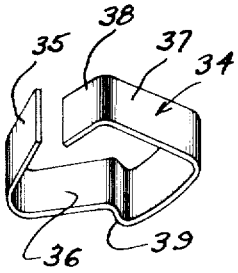
Figure 3 is a perspective view of one of the spring clip elements which is employed in the form of the invention illustrated in Figures 1 and 2 to detachably secure the ornamental member to the wheel.

As may be seen best in Figures 3 and 4 of the drawings, the spring clips 34 which are employed to detachably secure the ornamental member 28 to the wheel 10 are formed from a piece of resilient steel which was originally taken from flat stock. Resilient clip 34 includes a tail portion 35 which is bent back at an oblique angle with respect to the intermediate portion 36 of clip 34. The forward end 37 of the clip 34 is bent back at an oblique angle toward tail portion 35 and terminates in an end portion 38 which is bent inwardly with respect to the intermediate portion 36 at approximately a 90° angle with respect to the forward portion 37. For a reason which will presently appear, the intermediate portion 36 has a jog 39 therein as is clearly shown in the various figures of the drawings. As will readily be perceived from Figures 3 and 4, the spring 34 has a general appearance of being curled up on itself.

As may be seen best in Figure 4 of the drawings, the spring clip 34 is mounted on the wheel by inserting the tail portion 35 and the portion of the intermediate section 36 to the rear of jog 39 through an aperture 40 in tab 22 of wheel 10. It is to be understood that each tab circumferentially spaced about wheel 10 is provided with an aperture 40 near its outer end. This aperture is slightly wider than the width of the spring clip 34 and is slightly broader than the thickness dimension of the spring clip 34.

After the spring clip 34 has been inserted through aperture 40 in tab 22, as it is shown in its full line position in Figure 4, the spring clip 34 is rocked in a counterclockwise direction until it has assumed the position shown in the dotted line in Figure 4. This rocking motion may be accomplished in any suitable manner such as by forcing the tail portion 35 back with a screwdriver or other suitable implement. When the spring clip 34 is in the position shown in the dotted lines in Figure 4, it will be understood that it will be very difficult to remove the clip due to the fact that tip end 41 of the tail portion 35 makes a biting engagement with the outer wall 19 of annular recess 18. That is to say, due to the fact that the tail portion 35 of the spring clip is wedged between the outer wall 19 and the inner wall 21 of the annular recess 18 and due to the fact that the tail portion 35 extends forwardly in the recess at an oblique angle, it is clear that the spring clip 34 is very firmly and tightly secured to the wheel without necessitating a welding, riveting, or similar operation. Although the portion of the tail 35 of spring clip 34 adjacent the intermediate portion 36 of the clip is shown as resting against the base wall 20 of annular recess 18, it is to be understood that this is not necessary, since the wedging action is primarily effected by the engagement of the outer wall 19 and the inner wall 21 of the recess 18.

Although the number of spring clips 34 which are employed on a wheel may be varied without departing from the spirit and scope of the invention, it has been found that if five clips are mounted on the wheel, a very effective and satisfactory form of attaching means is obtained.

Figure 5:
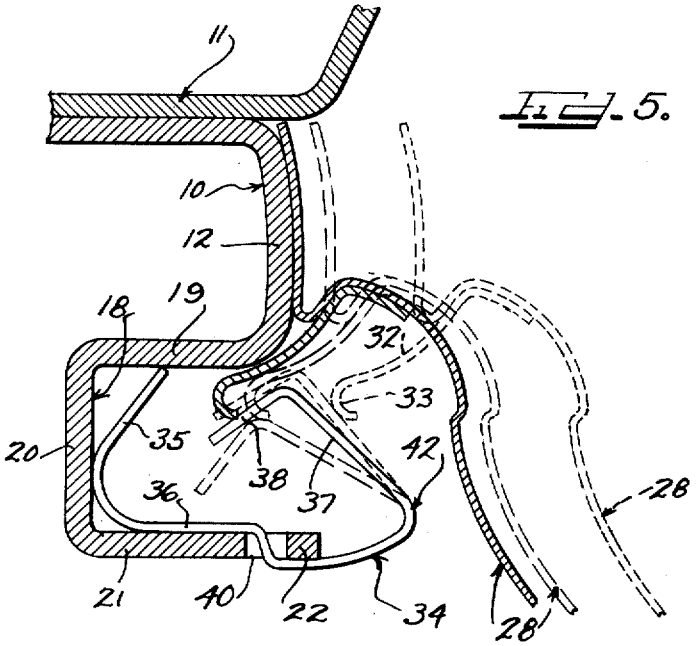
Figure 5 is a greatly enlarged fragmentary view of the structure shown in the upper portion of Figure 1 illustrating the various positions assumed by the free end of the spring clip as the ornamental member is moved into desired position on the wheel.

Figure 5 of the drawings illustrates how the free end of the spring clip 34 is fixed as the ornamental member 28 is being moved into desired position on the wheel and also illustrates the manner in which this spring effects an easy-on hard-off securing engagement with the ornamental member 28. The short dotted lines in Figure 5 illustrate the spring clip 34 and the ornamental member 28 in their respective positions when the underturned edge 33 of the fastening skirt 32 is first moved into contact with the forward portion 37 of the clip. The spring, as shown in the short dotted lines, is thus in its unflexed position. As movement of the ornamental member 28 is continued to the left, the underturned edge 33 rides along the forward portion 37 of the spring clip 34 thereby flexing it inwardly. The position of the spring clip 34 and the ornamental member 28 as the underturned edge 33 of the latter reaches the high point of the clip is shown in the long dotted lines in Figure 5 of the drawings. It is to be noted that due to the fact that the point of flexure of the forward portion 37 of spring clip 34 is rearwardly of the point of engagement of the ornamental member with the forward portion 37, taken with respect to the direction of motion of member 38, the spring is very readily flexed by the underturned edge 33 of the ornamental member 28.

As the underturned edge 33 passes the high point of the spring clip 34, the end portion 38 of clip 34 rides up behind the underturned edge 33 until it assumes the position as shown in the full lines of Figure 5. By virtue of the fact that the end portion 38 of the spring clip 34 is on the opposite side of the underturned edge 33 from the wheel, it will readily be understood that the ornamental member 28 is firmly and securely held in desired position on the wheel 10.

It will be noted that when it is desired to remove the ornamental member 28 from the wheel 10, the point of flexure of the spring element 34 is no longer to the rear of the underturned edge 33 with respect to the direction of motion of the ornamental member 28. That is to say, the point of flexure, which is indicated generally at 42, is to the right of the point of engagement of the spring clip 34 with the underturned edge 33, and due to the fact that it is necessary to remove the ornamental member 28 by moving it to the right, a relatively great force is required to effect this movement. This is by reason of the fact that spring clip 28 tends to buckle in its middle rather than flex downwardly out of the path of the underturned edge 33 as it did when the ornamental member 28 was being mounted on the wheel. Because the end portion 38 is at an oblique angle with respect to the axis of the wheel, however, it will readily be apparent that it is possible to cause a downward flexure of the forward portion 37 if a sufficiently great force is applied to the ornamental member 28. The amount of force which is necessary to remove the ornamental member 28 from the wheel assembly may be adjusted by varying the angle at which the forward portion 37 extends away from its point of flexure 42, or by varying the angle at which the end portion 38 is disposed with respect to the direction of the removal force (that is to say, with respect to the horizontal). The amount of force that is necessary to remove the ornamental member 28 from the wheel may also be adjusted by varying the distance between the point of contact of the end portion 38 and the underturned edge 33 and the high point of the spring clip 34. That is to say, by increasing the amount of the end portion 38 which extends up behind the underturned edge 33, the force which is necessary to remove the ornamental member 28 is increased.

From the above description, it will be apparent that I have provided an extraordinarily simple, yet effective arrangement for detachably securing an ornamental member to a wheel. The novel arrangement permits the ornamental member to be mounted on the wheel by simply moving it axially inwardly against the side of the wheel. It should also be noted that with this particular arrangement, the ornamental member will be self-centered on the wheel. Furthermore, it is to be observed that while only a very slight pressure on the outside of the ornamental member is necessary to snap it into retaining engagement with the novel spring clips which are carried on the wheel (in fact, it has been found in practice that an ornamental member of the character described may be mounted by simply pressing it on with one or two fingers), a relatively great force is necessary to dismount the ornamental member from the wheel. One convenient method for dismounting the ornamental member from the wheel is to insert the end of a screwdriver or other pry-off tool within the reentrant groove on the outer edge of the ornamental member 28 immediately above the fastening skirt 32, and then give the screwdriver or tool a sharp jerk.

Figure 6:
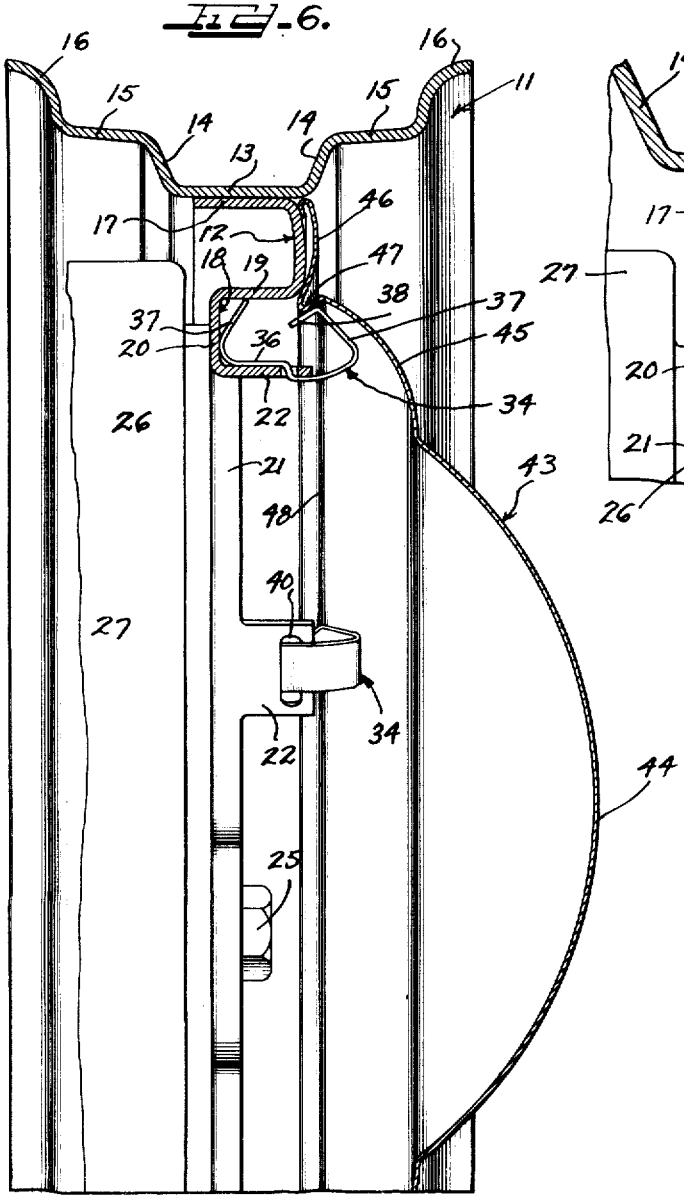
Figure 6 is a side elevational view, partly in cross section, of the upper half of a wheel assembly illustrating an ornamental member of different configuration from that shown in Figure 1 but having substantially the same form of ornamental member retaining means on the wheel.
Figure 7:
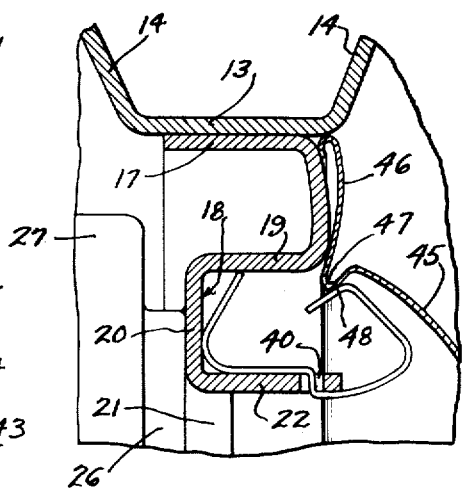
Figure 7 is an enlarged fragmentary elevational view, partly in cross section, of the upper portion of Figure 6.

In Figures 6 and 7 of the drawings, a form of the invention is shown in which the novel form of spring clips which are shown in the preferred embodiment of the invention are the same but wherein a different type of ornamental member is adapted to be secured thereby. Those portions of the wheel assembly which are the same as corresponding elements in the embodiment of the invention illustrated in Figures 1 to 5 of the drawings have been given the same reference characters. The wheel 10 including rim 11 and body part 12 is shown as being of identical form as that shown in Figure 1, and the spring clips 34 which are employed to detachably secure the ornamental member to the wheel are of substantially the same form as those previously described, with the exception that the forward portion 37 is preferably slightly shorter than that shown in Figure 1. An ornamental member 43 having a different form than that previously described is provided in this embodiment of the invention. More particularly, ornamental member 43 includes a central dome-shaped portion 44, an intermediate portion 45, and an outer apron portion 46. Instead of providing the ornamental member 43 with a separate attaching skirt such as was described in connection with the preferred embodiment of the invention, the ornamental member is provided with a reentrant groove 47 which extends rearwardly and inwardly at an oblique angle thereby providing an integral intermediately disposed fastening flange 48 with which the end portion 38 of the spring clip 34 is adapted to engage. The forward portion 37 of each spring clip 34 is flexed by flange 48 as the ornamental member 43 is moved into the desired position on the wheel in precisely the same manner as the forward portion 37 is flexed by the underturned edge 33 of the fastening skirt 32 of Figure 1. After the inner end of the flange 48 passes over the high point of the spring clip 34 between forward portion 37 and end portion 38, the end portion 38 snaps into position behind the flange 48 to firmly and securely hold the ornamental member 43 in desired position on the wheel. The ornamental member 43 is removed from the wheel by inserting a screwdriver or other suitable pry-off tool in the reentrant groove 47 and giving the tool a sharp jerk thereby causing the ornamental member 43 to move axially outwardly away from the wheel.

Figure 8:
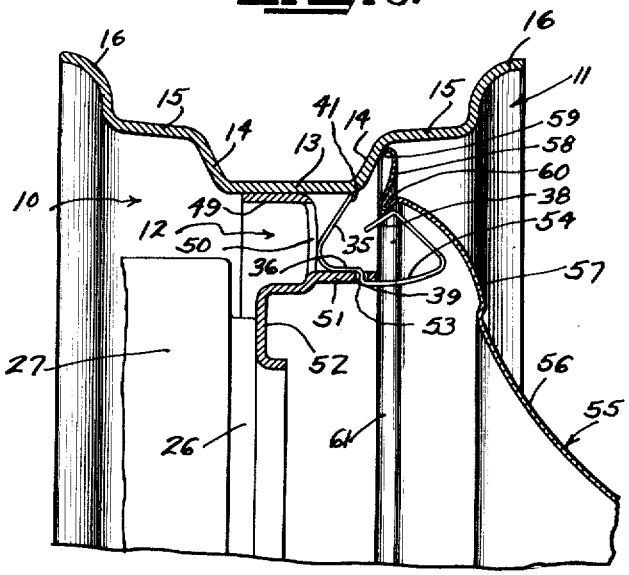
Figure 8 is a fragmentary elevational view illustrating a different form of ornamental member retaining element in which the end of the tail portion of the element makes a biting engagement with the base of the wheel rim rather than with a portion of the wheel body part.

Another modification of this invention is illustrated in Figure 8 of the drawings. The wheel 10 in this form of the invention includes a rim 11 having a base flange 13, opposite side flanges, opposite intermediate flanges 15, and opposite edges 16. The body part 12 of the wheel includes a laterally extending outer flange 49 which is secured to base flange 13 of rim 11 in any suitable manner such as by welding, riveting, or the like, and an intermediate portion 50 which has a plurality of circumferentially spaced tabs 51 struck out therefrom in the manner shown in Figure 8. Body part 12 is provided with a circular fastening flange 52 which is similar in shape to the annular recess portion 18 of Figure 1, with the exception that the tabs 22 of Figure 1 have been omitted. The circular fastening flange 52 is provided with suitable apertures (not shown) through which the usual wheel fastening bolts extend into threaded engagement with the fastening plate 26 of the brake drum 27. The struck out portions or tabs 51 of the body part 12 are each provided with an aperture 53 similar to the aperture 40 in the tab 22 of Figure 1. A plurality of spring clips 54 corresponding in number to the number of tabs 51 are provided which are similar in their general configuration to the spring clips 34 of the preferred embodiment of the invention. As may be seen in Figure 8 of the drawings, the tail portion 35 and the portion of the immediate part 36 to the rear of the jog 39 are slipped through the apertures 53 and wedged into the position shown in Figure 8.

In this form of the invention, it is to be noted that the tip 49 of the tail portion 35 extends into biting engagement with the base flange 13 of rim 11 rather than into engagement with a portion of the body part 12. For this reason, the tail portion 35 of the spring clip 54 is slightly longer than that of the preferred embodiment of the invention. It will thus be understood that tail portion of each spring clip is wedged between a portion of the body part 12 of the wheel and a portion of the rim 11.

An ornamental member 55 is provided for the wheel which is similar in its general configuration to the ornamental member 43 shown in Figure 6. More specifically, the ornamental member 55 includes a central dome-shaped portion 56, an intermediate portion 57, and an outer apron 58 which terminates in an underturned curled edge 59. Near the outer edge of the ornamental member 55 a reentrant groove 60 is provided which forms an obliquely rearwardly and inwardly extending fastening flange 61 which is adapted to be engaged by the end portion 38 of the spring clip 54.

The manner in which the ornamental member 55 is mounted on the wheel 10 and the manner in which the spring clips 54 engage the obliquely inwardly turned flange 61 to effect an easy-on hard-off detachable engagement therewith is the same as that described in connection with the preferred embodiment of the invention.

From the above description, it will be seen that I have provided an extraordinarily simple, yet effective method and means for mounting ornamental members on wheels. The novel means by which the ornamental member is detachably secured to the wheel includes the highly desirable characteristics which require only a slight deformation force to assemble the ornamental member on the wheel, but which require a relatively great force to dismount the member from the wheel. The novel securing means is also of a form which may be very economically and quickly assembled on a vehicle wheel and eliminates the need for welding or riveting the clip to the wheel.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. With a wheel having an irregular cross sectional configuration and having an ornamental member disposed thereon, an attaching means for detachably securing the member to the wheel comprising a plurality of self-securing resilient clips each having a tail portion adapted to be wedged between radially spaced portions of said irregular surface of said wheel, thereby to secure said clips to said wheel, and each of said clips having a free intermediate portion bent obliquely back on itself and terminating in a member engaging end portion which is bent at a substantial angle to said obliquely bent portion, said end portion being adapted to extend behind an annular portion of said member.

2. With a wheel having an annular recess in its outer face and an ornamental member having an underturned fastening flange disposed over said outer face, an attaching means for detachably securing the member to the wheel comprising a plurality of resilient clips for disposition in said recess, each of said clips having a tail portion which extends across said recess and makes a biting engagement with a wall thereof, and each of said clips having a free end portion bent obliquely back on itself into engagement with said underturned fastening flange of said member, said free end portion being bent in such a manner that when said member is being mounted on said wheel the clips are easily flexed but when said member is being removed from said wheel the clips are very difficult to flex.

3. With a wheel having an annular recess in its outer face and a plurality of tabs extending out from the inner wall of the recess having apertures therein, and an ornamental member disposed over said outer face having an obliquely radially inwardly and axially rearwardly extending attaching skirt with an underturned inner edge; attaching means for detachably securing the member to the wheel comprising a plurality of resilient leaf spring elements, each element extending through an aperture in said tabs along the radial inner wall of said recess and then across the recess into biting engagement with the radial outer wall of said recess, the outer portion of each element being bent obliquely axially rearwardly and radially outwardly on itself and then obliquely axially rearwardly and radially inwardly in a member engaging end portion, said end portions of said elements being adapted to engage said underturned edge of said fastening skirt on the side away from said wheel.

4. In an ornamental member and wheel assembly comprising a wheel having rim and body parts, and an ornamental member having an annular reentrant groove forming an obliquely inwardly extending fastening flange for disposition over an outer part of said wheel, said body part having an annular recessed portion on its outer face, the combination therewith of attaching means for detachably securing the member to the wheel comprising a plurality of spring clips each having an axial outward portion engageable with said fastening flange of said ornamental member, and a tail portion extending obliquely axially outwardly from the inner wall of said recess into biting engagement with the outer wall of said recess.

5. In an ornamental member and wheel assembly comprising a wheel having rim and body parts, and an ornamental member having an annular reentrant groove forming an obliquely inwardly extending fastening flange for disposition over an outer part of said wheel, said body part having a radially outwardly facing shoulder, the combination therewith of attaching means for detachably securing the member to the wheel comprising a plurality of spring clips each having an axial outward portion engageable with said fastening flange of said ornamental member, and a tail portion extending obliquely axially outwardly from said shoulder into biting engagement with said rim.

6. In an ornamental member and wheel assembly comprising a wheel having rim and body parts, and an ornamental member having obliquely inwardly extending fastening flange for disposition over an outer part of said wheel, said body part having a radially outwardly facing shoulder and a plurality of circumferentially spaced apertured tabs extending from the outer edge of the shoulder, the combination therewith of attaching means for detachably securing the member to the wheel comprising a plurality of spring clips each having an axial outward portion bent obliquely back on itself towards the rim of said wheel which terminates in a bent tip portion engageable with said fastening flange, the central portion of said clip being bent to extend through an aperture in said tab along the base of said shoulder, and a tail portion of said clip extending obliquely axially outwardly from said shoulder into biting engagement with a portion of said wheel.

7. In an ornamental member and wheel assembly comprising a wheel having rim and body parts, and an ornamental member having an obliquely inwardly extending fastening flange for disposition over an outer part of said wheel, said body part having a radially outwardly facing shoulder and a plurality of circumferentially spaced apertured tabs extending from the outer edge of the shoulder, the combination therewith of attaching means for detachably securing the member to the wheel comprising a plurality of spring clips each having an axial outward portion engageable with said fastening flange to detachably retain said member on said wheel, and an intermediate portion extending through an aperture in said tab along said shoulder, and a tail portion extending obliquely axially outwardly from said shoulder into biting engagement with a portion of said wheel.

8. In a wheel structure, tire rim and body parts, said body part having shoulder means adjacent the junction of said parts, an ornamental member for the wheel, and spring retaining clips for use in the detachable retention of said member on the wheel, each of said clips being resiliently wedged between said shoulder means and said rim part.

9. In a wheel structure, tire rim and body parts, said body part having shoulder means adjacent the junction of said parts, an ornamental member for the wheel, and spring retaining clips for use in the detachable retention of said member on the wheel, each of said clips being resiliently wedged between said shoulder means and said rim part, said shoulder means comprising a depressed portion in said body part and which leaves a transverse opening in the body part at said junction of said wheel parts.

10. In a wheel structure, tire rim and body parts, said body part having shoulder means adjacent the junction of said parts, an ornamental member for the wheel, and spring retaining clips for use in the detachable retention of said member on the wheel, each of said clips being resiliently wedged between said shoulder means and said rim part, said shoulder means providing a seating surface for the spring clip and which surface directly faces the base of said rim part.

11. In a wheel including tire rim and body parts, an ornamental cover member detachably cooperable with said wheel and snap-on spring clips for retaining the cover member on the wheel and each being insertable in a space between said body and rim parts, each clip resiliently gripping one of said parts and being backed up by the other part whereby the clip is wedgingly secured in position between the parts.

12. In a wheel including tire rim and body parts, an ornamental cover member detachably cooperable with said wheel and snap-on spring clips for retaining the cover member on the wheel and each being insertable in a space between said body and rim parts, each clip resiliently gripping one of the parts and being backed up by the other part whereby the clip is wedgingly secured to said parts, said clip including an angular gripping end which cooperates with said wheel parts and an outer flexible end portion turned back upon the body proper of the spring clip and being yieldable upon engagement by said cover member, said turned back portion being contractible and expansible in the application and removal of the cover to and from the wheel.

13. In a wheel including tire rim and body parts, an ornamental cover member detachably cooperable with said wheel and snap-on spring clips for retaining the cover member on the wheel and each being insertable in a space between said body and rim parts, each clip resiliently gripping one of the parts and being backed up by the other part whereby the clip is wedgingly secured to said parts, said clip including an inclined gripping end portion and a curved free flexible end portion engageable by the cover member both of which are on the same side of the clip body.

14. In a wheel structure, a tire and body part and a cover member for a portion of the wheel, said cover member being detachably retained on the wheel by a plurality of spring retaining elements, each of said elements having an intermediate portion formed to bear against one of said wheel parts and having an end portion flexible relative to the bearing of said intermediate portion on said wheel part for retainingly gripping the wheel and said end portion being forced into holding engagement by reason of the aforesaid bearing.

15. In a wheel structure, a tire and body part and a cover member for a portion of the wheel, said cover member being detachably retained on the wheel by spring retaining means, said means having an intermediate portion forming to bear against one of said wheel parts and having an end portion flexible relative to the bearing of said intermediate portion on said wheel part for retainingly gripping the wheel and said end portion being forced into holding engagement by reason of the aforesaid bearing.

GEORGE ALBERT LYON.